United States Patent Office 2,810,736
Patented Oct. 22, 1957

2,810,736

CYCLOPENTADIENYLIRON AND HYDROCARBON-SUBSTITUTED CYCLOPENTADIENYL-IRON CARBONYL COMPOUNDS

Willard E. Catlin and John C. Thomas, Wilmington, Del., assignors to E. I. du Pont de Nemours and Company, Wilmington, Del., a corporation of Delaware No Drawing. Application July 1, 1953,
Serial No. 365,548

2 Claims. (Cl. 260—439)

This invention relates to a new class of organometallic derivatives. More particularly, this invention relates to new organometallic carbonyl derivatives of iron.

Organometallic compounds, wherein the metal atom is bonded directly to carbon of organic radicals, have found utility in catalytic and synthetic processes. For example, tetraethyllead is used as an antiknock agent in spark ignition engines; organomercury compounds are used in the fungicide field, particularly as seed disinfectants; and organomagnesium, organosodium and organolithium compounds are used in organic syntheses. Carbonyl compounds of various metals, and in particular of those of group VIII, have found importance in synthetic reactions and as catalysts.

Recently [Kealy and Pauson, Nature 168, 1039 (1951)] there has been disclosed a compound having two cyclopentadienyl radicals directly attached to an iron atom. This compound has been considered unique in that, according to Wilkinson et al. in J. Am. Chem. Soc. 74, 2125 (1952), all five positions of the cyclopentadienyl ring in dicyclopentadienylmetallics are equivalent and no isomerism with respect to any one cyclopentadiene ring is possible. Other group VIII organometallics of cyclopentadiene have been reported. For example, the cobalt compound has been prepared by Wilkinson, J. Am. Chem. Soc. 74, 6146–9 (1952), and the nickel derivative is the subject of Thomas, U. S. patent application, Serial No. 298,170, filed July 10, 1952, now U. S. Patent 2,680,758, issued June 8, 1954. Wilkinson has also reported the preparation of corresponding dicyclopentadienyl derivatives of ruthenium, rhodium, iridium, and palladium. In these organometallic compounds of the group VIII elements, there are two cyclopentadienyl radicals directly linked through carbon thereof to the metal atom. Many investigators have attempted to explain the unusual stability of these compounds as due not only to the particular type of organic radical bonded to the metal, but also due to the fact that there are two radicals so linked.

In general the group VIII derivatives of cyclopentadiene have been prepared by the reaction of a Grignard reagent of a cyclopentadiene hydrocarbon with a group VIII metal halide under anhydrous conditions. Recently it has been found that dicyclopentadienyliron can be obtained by reacting cyclopentadiene with iron pentacarbonyl at temperatures of 220–500° C. under pressure (Anzilotti and Weinmayr, U. S. patent application, Serial No. 292,388, filed June 7, 1952, now Patent No. 2,791,597).

It is an object of this invention to provide a new class of organometallic compounds. A further object is to provide new organometallic carbonyl compounds of iron. Other objects will appear hereinafter.

These objects are accomplished by the following invention of organometallic carbonyl compounds of iron in which the iron is bonded directly to at least one carbonyl group and is further bonded to a carbocyclic hydrocarbon radical containing a cyclopentadiene ring through nuclear or ring carbon of the cyclopentadiene ring.

The compounds of this invention are readily obtained by the reaction at temperatures of below 220° C., and preferably between 160° and 210° C., generally under superatmospheric pressures, of an iron carbonyl, such as iron pentacarbonyl, with a carbocyclic hydrocarbon containing a cyclopentadiene ring, such as cyclopentadiene.

The following example illustrates a specific embodiment of the preparation of the new compounds of this invention.

EXAMPLE

*Preparation of cyclopentadienyliron carbonyl*

Ninety-eight grams (0.5 mole) of iron pentacarbonyl and 66 g. (1.0 mole) of cyclopentadiene in the form of its dimer were charged into a stainless steel bomb under dry nitrogen. The bomb was closed, evacuated, vented with dry nitrogen to atmospheric pressure, and heated at 200° C. with rocking over a period of about 2 hours, and then allowed to cool to room temperature. The product was a dark brown mixture of a viscous liquid and a crystalline solid. The solid was broken up under 200 ml. of n-hexane, and the mixture was chilled in ice and pressure-filtered under dry nitrogen. The solid on the filter was washed twice with cold n-hexane and dried in a stream of dry nitrogen. There was thus obtained 59 g. (67%) of a dark red, crystalline solid, which was shown by analysis to be substantially pure cyclopentadienyliron carbonyl.

A sample of a product prepared in the same manner, but in the presence of a small amount of copper powder, was purified by recrystallization from n-heptane (120 ml. of n-heptane per gram of solid) in an atmosphere of dry nitrogen and in the absence of direct sunlight.

*Analysis.*—Calcd. for [C₅H₅Fe(CO)₂]I₂: C, 47.50; H, 2.85; Fe, 31.55; M. W., 354. Found: C, 47.71; H, 3.06; Fe, 31.76; M. W. 336 (ebull. in benzene).

The infrared absorption spectrum of the product contained a C—H band at 3.25, indicating that all the C—H groups of the C₅H₅ ring were equivalent. The spectrum also contained a band at 5:15, corresponding to a donor type carbonyl group (←CO) and a band at 5.65, corresponding to a bridge type

carbonyl. The data indicate the compound has the structure

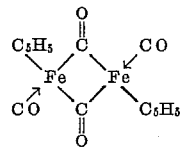

It will be understood that the above example is merely illustrative and that the invention broadly comprises the production of organometallic compounds in which iron is directly bonded to both carbonyl and to a carbocyclic hydrocarbon radical containing a cyclopentadiene ring through nuclear or ring carbon of the cyclopentadiene ring. Although the cyclopentadienyl radical is particularly suited for reasons of availability and reactivity, this invention is not limited to this particular radical. Monovalent radicals derived from the cyclopentadienyl radical which have hydrocarbon substituents on the ring are likewise useful.

The compounds thus embraced by this invention have iron bonded directly to a carbocyclic hydrocarbon radical containing a cyclopentadiene ring through nuclear carbon of the cyclopentadiene ring, such as the cyclopentadienyl radical, and also bonded directly from the iron at least one carbonyl group, i. e., the CO group. Compounds specifically included in the scope of this invention, in addition to cyclopentadienyliron carbonyl, are methylcyclopentadienyliron carbonyl and phenylcyclopentadienyliron carbonyl.

The compounds of this invention have the grouping represented by the general formula R—M(CO)$_2$ wherein R is the aforesaid carbocyclic radical containing a cyclopentadiene ring and is bonded to the metal M through nuclear carbon of the cyclopentadiene ring and M is iron. The general formula for these iron organometallic carbonyl compounds is indicated to be [R—M(CO)$_2$]$_2$ which can be represented by the following general structural formula:

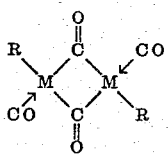

wherein R is a carbocyclic radical containing a cyclopentadiene ring as aforesaid, and M is iron. This general formula can be more simply represented with the chemical symbol Fe substituted for M as follows [R—Fe(CO)$_2$]$_2$. It is preferred that R be the cyclopentadienyl radical or cyclopentadienyl groups containing usually not more than four hydrocarbon substituents of 1 to 12 carbon atoms. Also included are those compounds where R is a cyclopentadienyl radical having one hydrocarbon substituent such as the monophenylcyclopentadienyl radical and lower monoalkylcyclopentadienyl radical e. g., the methylcyclopentadienyl radical, with linkage of said radical to iron being through nuclear carbon of the cyclopentadienyl nucleus. As shown by the general structural formula, the iron organometallic carbonyl compounds contain two iron atoms each of which is bonded directly to nuclear carbon of the carbocyclic radical and is further bonded to a plurality of carbonyl groups, two of which form a bridge through carbonyl carbon between the two iron atoms.

The compounds of this invention can be obtained by the reaction of an iron carbonyl such as iron pentacarbonyl, under anhydrous conditions at elevated temperatures and preferably under superatmospheric pressure with a cyclic hydrocarbon containing a cyclopentadiene ring having preferably at most one substituent and that a monovalent hydrocarbon radical. The temperature of the reaction is maintained at generall not in excess of 210° C. since, at temperatures of above 200° C. and particularly above 220° C., the resulting organometallic carbonyl undergoes decomposition. At temperatures above 220° C., e. g., 250° C., dicyclopentadienyliron formation is the predominant reaction. The use of superatmospheric pressure at temperatures of 160° C. or higher reduces the amount of decomposition during the reaction. A temperature of between 160° C. and 210° C. is generally preferred since it gives optimum yields. The amount of cyclic hydrocarbon employed is generally in excess of that of the carbonyl on a molar basis, since the carbonyl is generally more expensive. In general, added solvents are unnecessary although solvents, such as purified aliphatic hydrocarbons, can be used, particularly for recrystallization of the carbonyls.

The compounds of this invention are particularly useful as antiknock agents in spark ignition engines. They can also be used as catalysts for organic reactions, for example, in carbon monoxide reactions.

As many apparently widely different embodiments of this invention may be made without departing from the spirit and scope thereof, it is to be understood that this invention is not limited to the specific embodiments thereof except as defined in the appended claims.

We claim:
1. An iron carbonyl compound of the formula

[R—Fe(CO)$_2$]$_2$ wherein R is selected from the class consisting of the cyclopentadienyl, the monophenylcyclopentadienyl and lower monoalkylcyclopentadienyl radicals, and each of the two iron atoms is bonded directly to one and only one of said radicals through nuclear carbon of the cyclopentadienyl nucleus, and each of said two iron atoms is further bonded directly to carbonyl carbon of three carbonyl groups, two of which form separate bridges through carbonyl carbon between said two iron atoms.

2. The cyclopentadienyliron carbonyl compound of the formula

[R—Fe(CO)$_2$]$_2$ wherein R is the cyclopentadienyl radical, and each of the two iron atoms is bonded directly to one and only one cyclopentadienyl radical through nuclear carbon thereof, and each of said two iron atoms is further bonded directly to carbonyl carbon of three carbonyl groups, two of which form separate bridges through carbonyl carbon between said two iron atoms.

References Cited in the file of this patent
UNITED STATES PATENTS

| 2,680,756 | Pauson | June 8, 1952 |
| 2,683,157 | Weinmayr | July 6, 1954 |
| 2,694,721 | Weinmayr | Nov. 16, 1954 |

OTHER REFERENCES

Wilkinson: J. A. C. S., vol. 74, page 6148 (Dec. 5, 1952). (Received June 12, 1952.)

Fischer: Angewandte Chemie, vol. 64, #22 (Nov. 1, 1952).